(No Model.)
M. H. LOTHROP.
TIRE PROTECTOR.
No. 509,925. Patented Dec. 5, 1893.
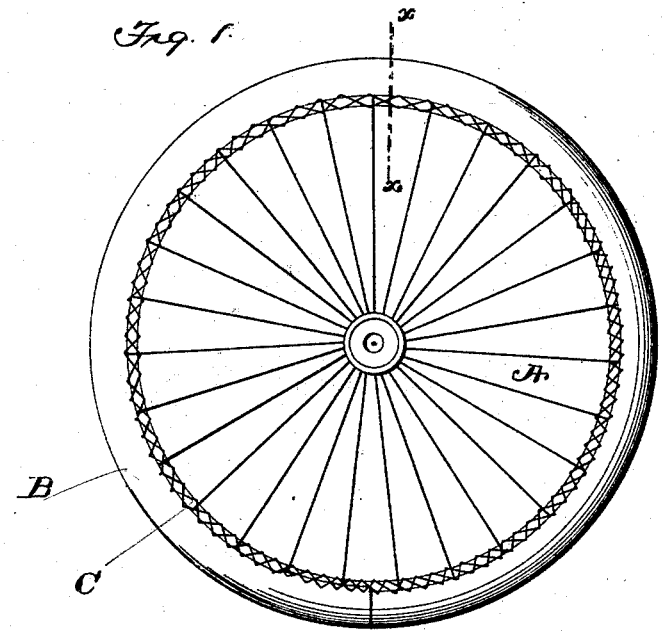
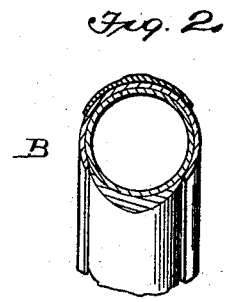
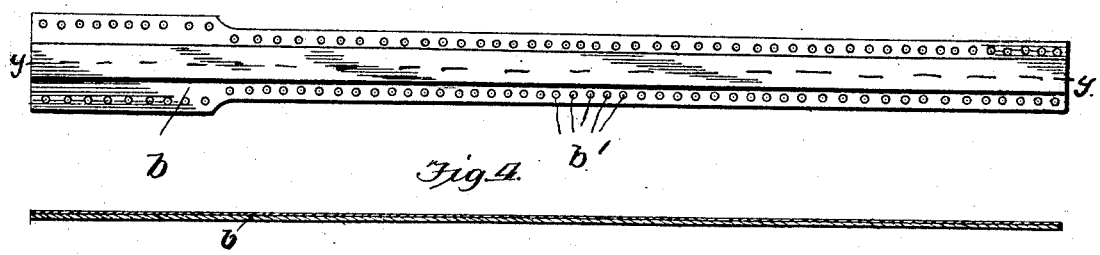
Witnesses
Chas. S. Hyer
Inventor
M. H. Lothrop
By John Wedderburn
Attorney

UNITED STATES PATENT OFFICE.

MATTHEW HALE LOTHROP, OF JACINTO, CALIFORNIA.

TIRE-PROTECTOR.

SPECIFICATION forming part of Letters Patent No. 509,925, dated December 5, 1893.

Application filed May 25, 1893. Serial No. 475,535. (No model.)

*To all whom it may concern:*

Be it known that I, MATTHEW HALE LOTHROP, of Jacinto, in the county of Glenn and State of California, have invented certain new and useful Improvements in Tire-Protectors; and I do hereby declare the following to be a full, clear, and exact description of the invention, such as will enable others skilled in the art to which it appertains to make and use the same.

This invention is an improved protector for pneumatic tires; and is designed to prevent said tires from being punctured or slipping off the wheel rim.

My invention consists simply of a strip of leather of sufficient thickness to protect the tire, and yet be pliable, of sufficient length to completely encircle the tire when inflated, and of a width sufficient to embrace the tire and part of the rim, and supplied with a covering of rubber, which is stretched at the edges.

In the drawings forming a part of this specification Figure 1 is a side view of a wheel, provided with my improvement. Fig. 2 is a section taken on line 2—2, Fig. 1. Fig. 3 is a view of the protector detached. Fig. 4 is a section on the line $y$—$y$, Fig. 3.

Referring to the drawings, A indicates a wheel having a pneumatic tire; B, the protector, and C, the lacings for securing the protector to the wheel. The protector is made of leather or other suitable material, and its length and breadth will, of course, vary according to the size of the wheel. One end of the protector $b$ is made wider than the other, for the purpose of over-lapping the other end. Along each edge of the protecting strip are inserted the eyelets $b'$ through which the laces C, pass.

A strip D of rubber is applied to the center of the outer surface of the protector B, and is cemented in position and stretched at the edges. This will cause a better wearing action and add to the strength of the said protector.

In operation, the protecting strip is placed upon the tire and laced around said tire and rim, the same as the edges of a shoe or belt are laced; and after the lacing is completed, the ends of the laces are tied, and the tire is protected from puncture, and is also prevented from slipping off the wheel rim.

Having thus described my invention, what I claim is—

An improved tire protector, consisting of a narrow strip of leather, having one end broadened for the purpose of over-lapping the opposite end, and having eye-lets along each edge to receive a lace, an outer central strip of rubber, applied to the outer surface of the said leather strip, between the lines of eye-lets, substantially as described.

In testimony whereof I have signed this specification in the presence of two subscribing witnesses.

MATTHEW HALE LOTHROP.

Witnesses:
W. J. APPLEGATE,
R. L. DOUGLAS.